US008264857B2

(12) United States Patent
Mallwitz et al.

(10) Patent No.: US 8,264,857 B2
(45) Date of Patent: Sep. 11, 2012

(54) SYSTEM AND METHOD FOR A POWER CONVERTER HAVING A RESONANT CIRCUIT

(75) Inventors: Regine Mallwitz, Kassel (DE); Peter Zacharias, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 254 days.

(21) Appl. No.: 12/498,478

(22) Filed: Jul. 7, 2009

(65) Prior Publication Data

US 2010/0008107 A1  Jan. 14, 2010

(30) Foreign Application Priority Data

Jul. 9, 2008 (EP) .................................. 08012366
Dec. 23, 2008 (EP) .................................. 08022308

(51) Int. Cl.
H02M 3/335 (2006.01)

(52) U.S. Cl. ........ 363/21.02; 363/17; 363/126; 363/131

(58) Field of Classification Search ............... 363/17, 363/21.02, 21.03, 89, 98, 132, 126, 131
See application file for complete search history.

(56) References Cited

U.S. PATENT DOCUMENTS

| | | | |
|---|---|---|---|
| 5,357,419 A | 10/1994 | Limpaecher | |
| 6,061,259 A | 5/2000 | DeMichele | |
| 6,737,847 B2 * | 5/2004 | Watanabe et al. | 323/288 |
| 6,912,137 B2 * | 6/2005 | Berghegger | 363/21.03 |
| 6,934,167 B2 * | 8/2005 | Jang et al. | 363/21.02 |
| 7,495,935 B2 * | 2/2009 | Chen et al. | 363/21.12 |

(Continued)

FOREIGN PATENT DOCUMENTS

DE  10 2004 037 446 B4  6/2006

(Continued)

OTHER PUBLICATIONS

Klaassens, J.B., "Power Conditioning With a Switched Series-Resonant Circuit Operating at a High Internal Frequency," 1987, pp. 193-203, IEEE.

(Continued)

Primary Examiner — Adolf Berhane
Assistant Examiner — Fred E Finch, III
(74) Attorney, Agent, or Firm — Slater & Matsil, L.L.P.

(57) ABSTRACT

A direct current-direct current (DC/DC) converter operated in the resonant mode of operation for converting a direct input voltage into a direct output voltage with a bridge circuit located on the input side and incorporating switching elements, with a resonance circuit incorporating a resonance inductance and a resonance capacitance as well as with a high-frequency transformer for galvanic separation is disclosed, the transformer incorporates at least one primary winding and at least one secondary winding with at least two winding terminals each. The alternating current (AC) output of the bridge circuit is connected to the primary winding and a rectifier bridge with diodes to the secondary winding. A voltage boosting circuit array is connected downstream of the resonant circuit in such a manner that at least one additionally controllable switching element is contained, which is connected in parallel or in series to at least one additional diode or to at least one diode of the rectifier bridge on the secondary side, this array being connected in parallel to the high-frequency transformer so that the additional switching element short-circuits the resonance circuit in a triggered condition so that energy is stored in the resonance inductance and is delivered in the non-triggered condition.

23 Claims, 8 Drawing Sheets

U.S. PATENT DOCUMENTS

| | | | |
|---|---|---|---|
| 2001/0054881 A1* | 12/2001 | Watanabe | 320/166 |
| 2004/0037100 A1* | 2/2004 | Orr et al. | 363/131 |
| 2004/0165403 A1* | 8/2004 | Crawford | 363/17 |
| 2007/0285952 A1* | 12/2007 | Zeng et al. | 363/21.02 |
| 2008/0037290 A1* | 2/2008 | Suzuki et al. | 363/17 |
| 2008/0055941 A1* | 3/2008 | Victor et al. | 363/17 |
| 2008/0055942 A1* | 3/2008 | Tao et al. | 363/21.03 |
| 2009/0290384 A1* | 11/2009 | Jungreis | 363/17 |
| 2010/0328967 A1* | 12/2010 | Cody et al. | 363/21.02 |

FOREIGN PATENT DOCUMENTS

| | | |
|---|---|---|
| DE | 10 2005 023 291 A1 | 11/2006 |
| EP | 1 369 985 A2 | 12/2003 |

OTHER PUBLICATIONS

Severns, R., "Topologies for Three Element Resonant Converters," 1990, pp. 712-722, IEEE.

* cited by examiner

SYSTEM AND METHOD FOR A POWER CONVERTER HAVING A RESONANT CIRCUIT

BACKGROUND OF THE INVENTION

A direct current-direct current (DC/DC) converter of the generic type is known from DE 102005023291 A1. On its input side, this converter incorporates a boost converter as well as a resonance converter so that, practically, there are provided two DC/DC converters or energy converter stages. This DC/DC converter has the advantage that the load of the switches is reduced in the resonance converter. In the event of discontinuous current, the switches turn on and off almost without any loss thanks to the incorporated resonance. Another advantage is its galvanic isolation. Through DC-AC converter clocking, high capacitive leakage currents may occur in photovoltaic (PV) generators. Galvanic isolation makes it possible to ground the photovoltaic generator and to eliminate these undesired currents as a result thereof. The boost converter located on the input side permits raising fluctuating input voltages, in particular lower input voltages. The direct voltage of a PV generator is often subject to strong fluctuations such as depending on the weather conditions, the day time or the season.

The disadvantage however is that a conducting boost converter diode also causes losses, when the boost converter is not operative.

BRIEF SUMMARY OF THE INVENTION

A preferred embodiment of the invention is a direct current-direct current (DC/DC) converter operated in the resonant mode of operation for converting a direct input voltage into a direct output voltage with a bridge circuit located on the input side and incorporating switching elements with a resonance circuit incorporating a resonance inductance and a resonance capacitance as well as with a high-frequency transformer for galvanic separation, said transformer incorporating at least one primary winding and at least one secondary winding with at least two winding terminals each, and the AC output of the bridge circuit being connected to the primary winding and a rectifier bridge with diodes to the secondary winding.

In accordance with the invention, high efficiency is achieved in that a voltage boosting circuit array is connected downstream of the resonance circuit in such a manner that at least one additional, controllable switch element is connected in combination with at least one diode so that the additional switch element short-circuits the resonance circuit when triggered so that energy is stored in the resonance inductance and is delivered again in the non-triggered condition, the additional component parts such as switches and diodes not participating in the current flow and thus not causing any losses when the at least one additional switching element is in the non-triggered condition.

The idea underlying the invention is to utilize a resonance converter with a high frequency (HF) transformer, and an additional boosting array that is located parallel to the HF transformer.

The boosting array preferably only operates at low direct current (DC) input voltage. If the DC input voltage exceeds a certain value, the boosting function of the additional array is no longer necessary so that it is inactive. Additional losses are not generated in the inactive condition because the array is switched parallel to the HF transformer. A current flow through the component parts of the boosting array only takes place if their active component parts are triggered. In this active condition, losses are also generated. The losses however only occur when the active switches of the array are being turned off. The turn-on operation is soft and hence almost loss-free.

In principle, resonance component parts may also be disposed on the secondary side and/or parallel. Appropriately, a choke and a resonance capacitor are connected in series with a primary winding. In principle, the boosting array may also be disposed on the primary side of the HF transformer. The prerequisite for the operability of the boosting array of the invention always is however, that the resonance circuit, in particular the resonance inductance or the part of the resonance inductance, is short-circuited. Accordingly, the array is connected downstream of the resonance component parts, in particular of the resonance choke and the resonance capacitor, and lays in the alternating voltage circuit of the converter. Resonance may also occur without any additional resonance choke or resonance capacitor, e.g., only through the primary winding and/or the inductance of a line and/or without additional capacitor, e.g., only through the parasitic capacitances of the HF transformer and/or half-bridge capacitors.

The boosting array includes at least one additional switching element in combination with diodes. The diodes may be integrated in the circuit as additional component parts. A particular advantage is obtained though if existing diodes, preferably diodes of the rectifier bridge located on the secondary side, are being used. This affords savings in component parts.

In an advantageous embodiment of the converter of the invention, there is provided to only utilize two additional switching elements that are connected in parallel with two already existing diodes of the rectifier bridge.

In a particularly advantageous embodiment, only one additional switching element is used, which is connected, with two additional diodes, in parallel with two already existing diodes of the rectifier bridge. As a result, the expense for triggering the additional switching elements is reduced with only a few additional component parts.

Further advantageous embodiments of the invention are recited in the dependent claims.

The DC/DC converter is particularly suited for photovoltaic inverters because it solves the problem of capacitive leakage currents of a photovoltaic generator by affording through galvanic separation ready grounding of the photovoltaic generator and through the boosting array an optimal and constant working point.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1a-4a show different embodiments of a DC/DC converter of the invention, operated in the resonant mode, FIGS. 1b-4b show current or voltage diagrams corresponding respectively to FIGS. 1a-4a.

DETAILED DESCRIPTION OF THE INVENTION

Figure 1A:
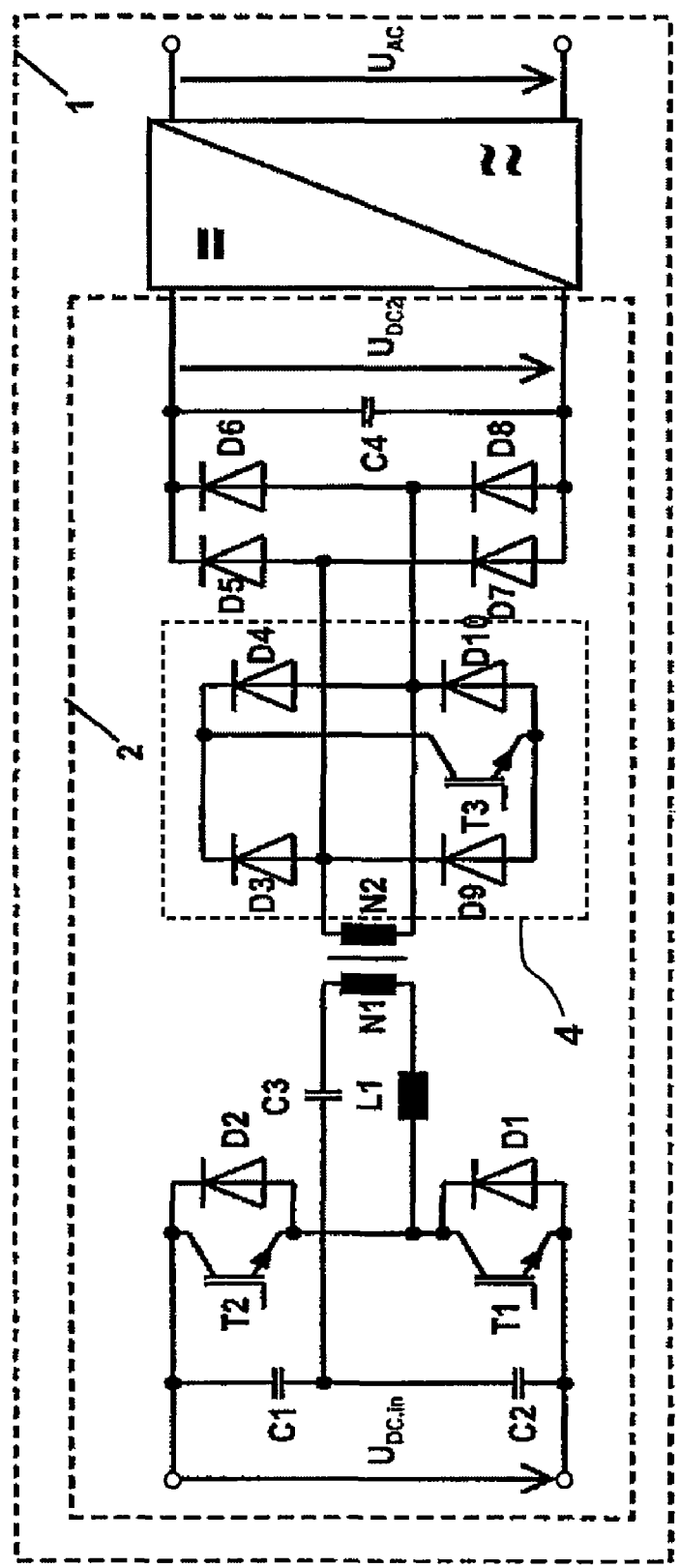

FIG. 1a shows a photovoltaic inverter 1 that includes a direct current-direct current (DC/DC) converter 2 and a direct current-alternating current (DC/AC) converter 3 with an output voltage $U_{AC}$ conforming to the grid. FIG. 1a shows in particular the DC/DC converter 2 operated in the resonant mode for converting a direct input voltage $U_{DC}$ in into a direct output voltage UDC2 with a bridge circuit on the input side. Herein, the bridge is shown as a half bridge, consisting of the two semi-conductor switches, preferably high-efficiency semi-conductor switches T1, T2, as well as of two capacitors C1, C2. It may also be configured to be a full bridge. There is further provided a resonance circuit with an high frequency (HF) transformer TR for galvanic separation. The resonance frequency is determined by a resonance inductance, in particular by a resonance choke L1, but also by the stray inductance of the HF transformer TR, and by a resonance capacitance, in particular a resonance capacitor C3, but also by the parasitic capacitances of the transformer TR and here by the existing capacitors C1, C2. The HF transformer TR has at least one primary winding N1 and at least one secondary winding N2. A rectifier bridge with diodes D5-D8 is connected to the secondary winding. This rectifier converts the output alternating voltage of the bridge array, which is transmitted via the HF transformer TR, into a direct voltage.

In accordance with the invention, a voltage boosting circuit array is mounted downstream of the resonance circuit, the array including of a semi-conductor switch T3 that is connected in parallel with the diodes D3, D9 and D4, D10 respectively. In FIG. 1a, the voltage boosting array 4 is connected in parallel with the secondary winding of the HF transformer TR. The pairs of diodes D3, D9 and D4, D10 respectively are connected in series. The central tap of the one diode series-connection is connected to the one end of the secondary winding of the transformer TR, the central tap of the other diode series connection is connected to the other end of the secondary winding of the transformer TR so that the short-circuit semi-conductor switch T3 or a respective one of the pairs of diodes D3, D10 and D4, D9 acts as a short-circuiting element in the resonance circuit, depending on the half wave when the semi-conductor switch T3 is in a triggered condition. The short-circuit created causes energy to be stored in the choke or in the choke and in the stray inductance of the HF transformer, which causes the voltage to increase when the semi-conductor switch T3 is opened. This circuit operates like a boost converter.

The component parts determining the resonance frequency are dimensioned such that the duration of the current flow is influenced during a half wave of the high-frequency current. The semi-conductor switches T1, T2 of the bridge are triggered alternately in such a manner that they only close when the current flow has faded. The additional component parts, the resonance inductance L1 or the resonance capacitance C3, can be disposed in a primary or in a secondary position. In FIG. 1a, both component parts are on the primary side, in series with the primary winding of the HF transformer TR.

Respective two of the four diodes D3, D4, D9 and D10 are connected in series. As shown in FIG. 1a, the diodes D3 and D9 as well as D4 and D10 are connected in series. The anode of the diode D3 is thereby connected with the cathode of the diode D9 and this point is in turn connected to the one end of the secondary winding N2 of the HF transformer TR. The anode of the diode D4 is connected to the cathode of the diode D10 and this point is in turn connected to the other end of the secondary winding N2 of the HF transformer TR. The cathodes of the diodes D3 and D4 are joined together and the anodes of the diodes D9 and D10 as well. The semi-conductor switch T3 is connected in parallel with the two pairs of diodes D3 and D9 and D4 and D10 respectively.

If the boosting array 4 is active, the semi-conductor switch T3 is triggered at twice the frequency of the semi-conductor switch T1 or T2. The semi-conductor switches T2 and T3 are turned on at the same time. The semi-conductor switches T2 and T3 are turned on during the positive half wave of the high-frequency current through the inductance L1. Then, the semi-conductor switches T1 and T3 are switched on at the same time. The semi-conductor switches T1 and T3 are switched on during the negative half wave of the high-frequency current through the inductance L1. Thereby, the turn-on time of the semi-conductor switch T3 is only a fraction of the turn-on time of the semi-conductor switch T2 or T1, more specifically 20%-40%, for example 30%.

Figure 1B:
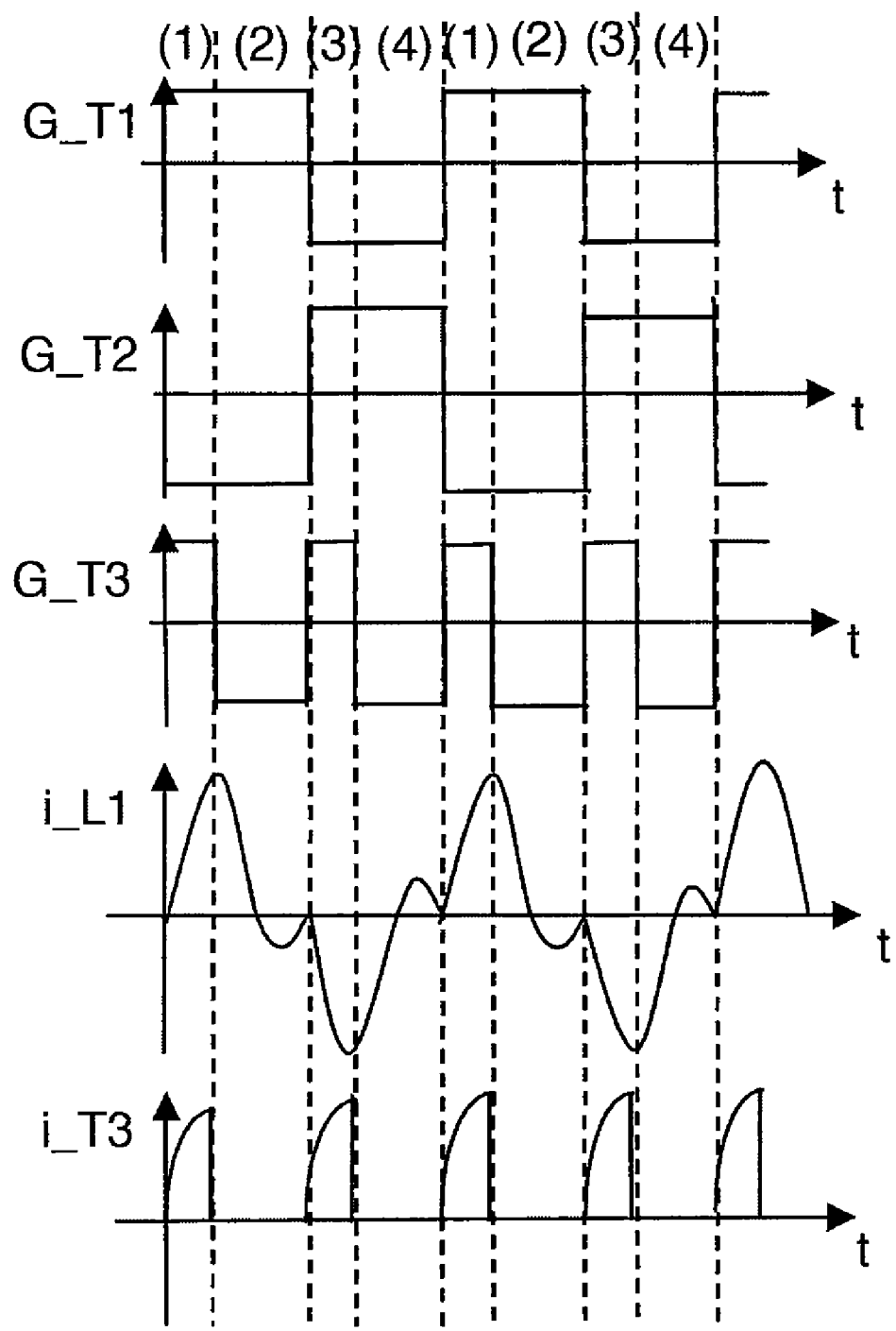

FIG. 1b shows the trigger signals at the gates of the semi-conductor switches T1, T2 and T3 as well as the current through the inductance L1 or the current through the semi-conductor switch T3 in the boosting mode of operation.

One distinguishes 4 switching conditions:
(1) T1 on, T2 off, T3 on
(2) T1 on, T2 off, T3 off
(3) T1 off, T2 on, T3 on
(4) T1 off, T2 on, T3 off In the switching condition (1), a positive current flows through the inductance L1 on the primary side. Since the semi-conductor switch T3 is closed, the current flows through the diode D3, T3 and D10 on the secondary side. Through the incorporated resonance, the current through the inductance L1 and also through the semi-conductor switch T3 is sinusoidal until the semi-conductor switch T3 is switched off. No energy is transmitted to the capacitor C4.

In the switching condition (2), the semi-conductor switch T3 is open. The current through the inductance L1 on the primary side continues to flow in a sine wave pattern. On the secondary side, the current flows through the rectifier diodes D5 and D8. The capacitor C4 is charged. The energy stored in the inductance L1 and in the capacitor C3 in the switching condition (1) is delivered to the capacitor C4 so that the output voltage is significantly increased.

In the switching condition (3), the semi-conductor switch T2 is closed and the semi-conductor switch T1 open. On the primary side, the current flows through the semi-conductor switch T2. On the secondary side, the semi-conductor switch T3 is closed so that a current flows through the diode D4, the semi-conductor switch T3 and the diode D9 on the secondary side. The current through the inductance L1 or through the semi-conductor switch T3 is again in a sine wave pattern due to the resonance component parts L1, C3. The sign of the current through L1 is contrary to the condition (1) or (2). In this condition, the capacitor C4 is not loaded any longer.

In the switching condition (4), the semi-conductor switch T3 is opened. The current on the secondary side now flows through the rectifier, namely through the diodes D6 and D7. The capacitor C3 is charged. The energy stored in the inductance L1 and in the capacitor C3 in the switching condition (1) is delivered to the capacitor C4 so that the output voltage is significantly increased.

Figure 2A:
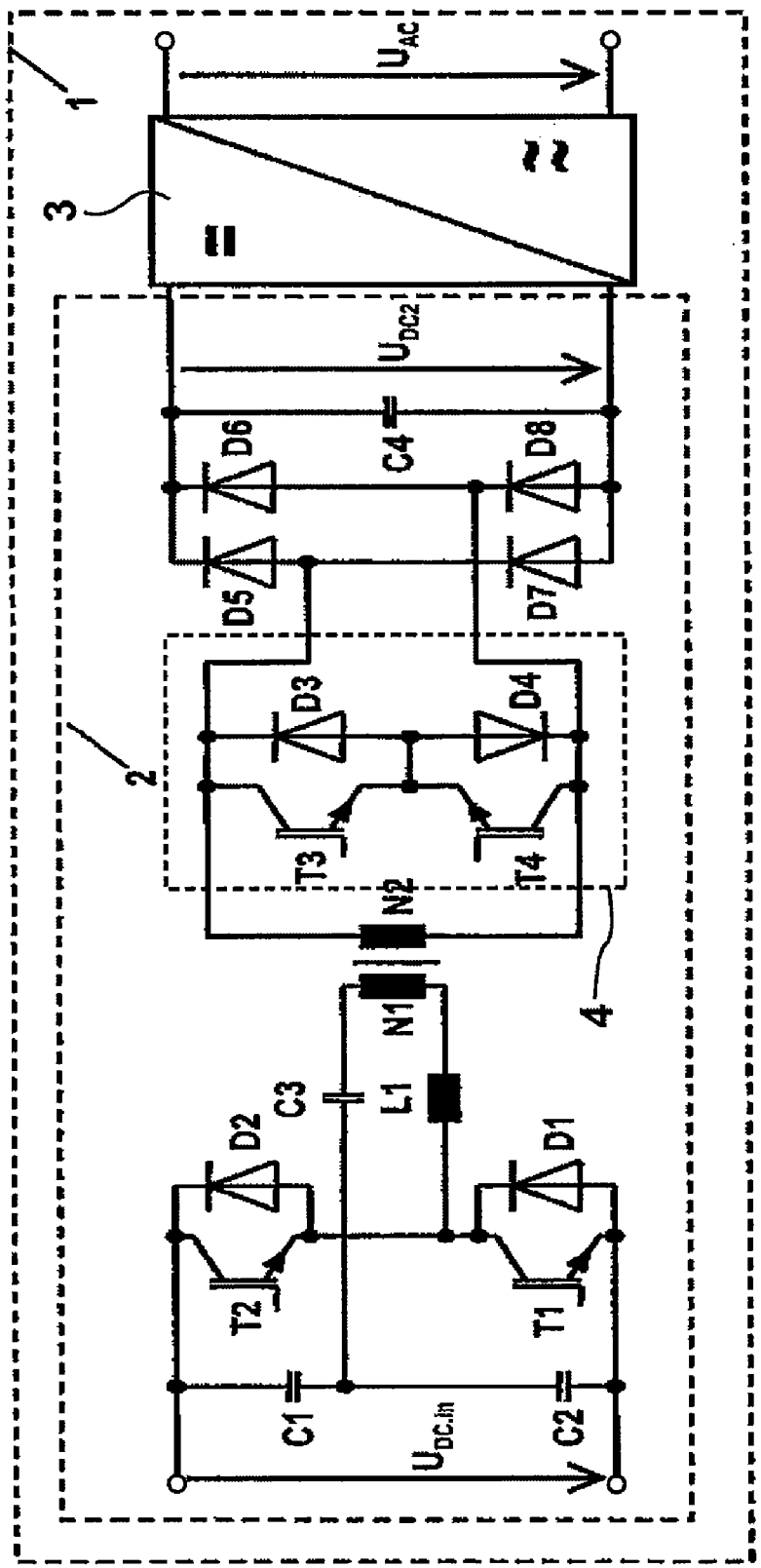

In the variant shown in FIG. 2a, a voltage boosting circuit array 4 consisting of two additional semi-conductor switches T3, T4 or diodes D3, D4, which are connected to the secondary winding N2, is mounted downstream of the resonance circuit in accordance with the invention. The semi-conductor switches T3, T4 are connected in series, anti-parallel to each other. This series-connection is arranged parallel to the secondary winding of the HF transformer. The diode D3 is anti-parallel to the switch T3 and the diode D4 is anti-parallel to the switch T4.

If the boosting array 4 is active, the semi-conductor switches T3 and T4 are alternately triggered at the same frequency as the semi-conductor switches T2 and T1. The semi-conductor switches T1, T3 as well as the semi-conductor switches T2, T4 are turned on at the same time. The semi-conductor switches T1 and T3 are turned on during the positive half wave of the high-frequency current through the inductance L1. The semi-conductor switches T2 and T4 are turned on during the negative half wave of the high-frequency current through the inductance L1. The turn-on time of the respective semi-conductor switches T3 and T4 thereby only is a fraction of the turn-on time of T1 and T2 respectively, more specifically 1%-40%, for example 30%.

Figure 2B:
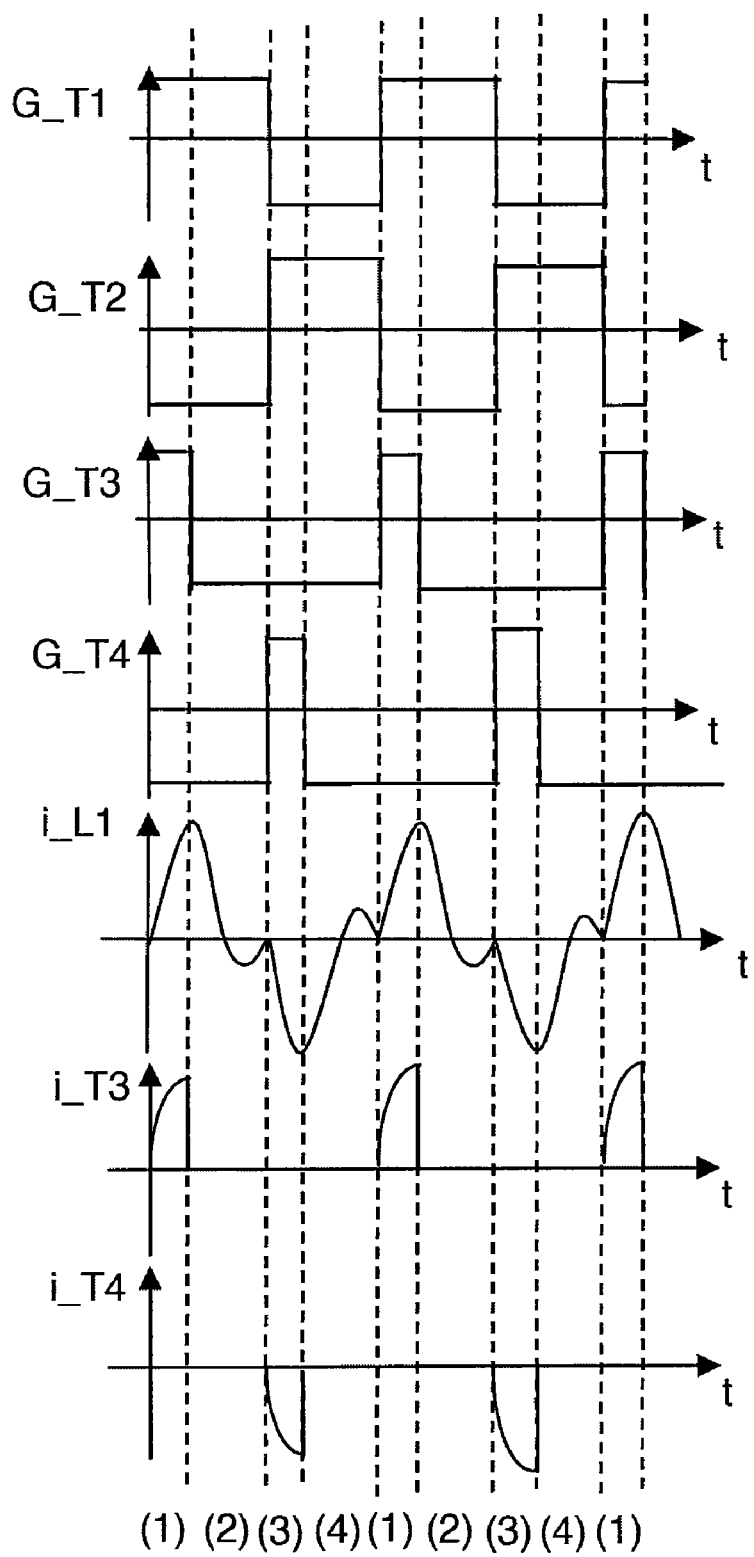

FIG. 2b shows the trigger signals at the gates of the active semi-conductor switches T1, T2, T3 and T4 as well as the current through the inductance L1 and the current through the semi-conductor switches T3 and T4 in the boosting mode of operation.

One distinguishes four switching conditions:
(1) T1 on, T2 off, T3 on, T4 off
(2) T1 on, T2 off, T3 off, T4 off
(3) T1 off, T2 on, T3 on, T4 off
(4) T1 off, T2 on, T3 off, T4 off In the switching condition (1), a positive current flows through the semi-conductor switch T1 on the primary side. Since the semi-conductor switch T3 is closed, the current flows through the semi-conductor switch T3 and through the diode D4 on the secondary side. Through the incorporated resonance, the current flows in a sine wave through the inductance L1 and also through the semi-conductor switch T3 until the semi-conductor switch T3 is turned off. There is no energy transmission onto the capacitor C4.

In the switching condition (2), the semi-conductor switch T3 is open again. The current on the primary side continues to flow in a sine wave through the inductance L1. On the secondary side, the current flows through the rectifier diodes D5 and D8. The capacitor C4 is loaded. The energy stored in the inductance L1 and in the capacitor C3 in the switching condition (1) is delivered to the capacitor C4 so that the output voltage is significantly increased.

In the switching condition (3), the semi-conductor switch T2 is closed and the semi-conductor switch T1 open. On the primary side, the current flows through the semi-conductor switch T2. On the secondary side, the semi-conductor switch T4 is closed so that a current flows through the semi-conductor switch T4 and the diode D3 on the secondary side. The current through the inductance L1 or through the semi-conductor switch T3 is again sinusoidal due to the resonance component parts L1, C3. The sign of the current is contrary to the condition (1) or (2). In this condition, the capacitor C4 is not charged further.

In the switching condition (4), the semi-conductor switch T4 is opened again. The current on the secondary side now flows through the rectifier, namely through the diodes D6 and D7. The capacitor C3 is charged. The energy stored in the inductance L1 and in the capacitor C3 in the switching condition (1) is delivered to the capacitor C4 so that the output voltage is significantly increased.

Figure 3A:
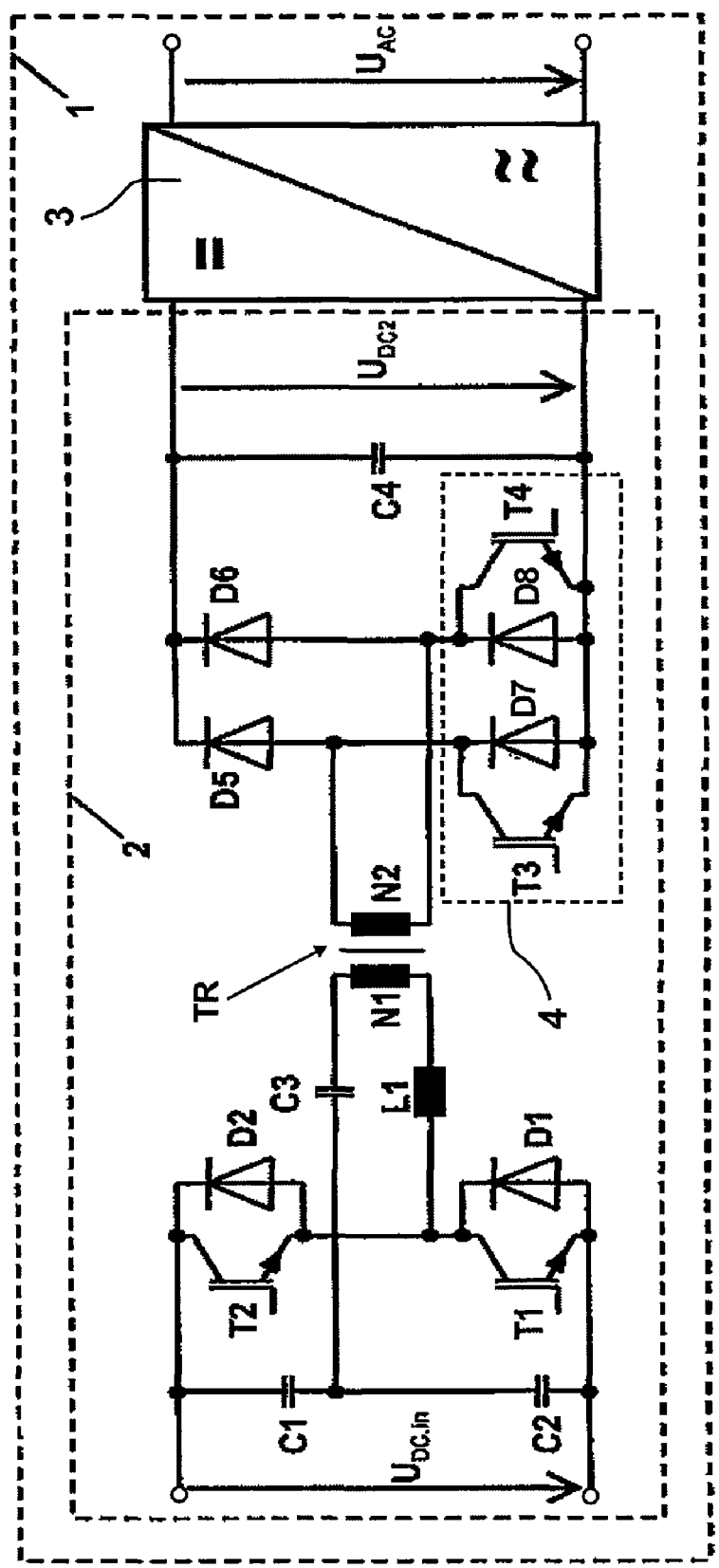

FIG. 3a shows a variant in which the array of the invention consists of two additional switching elements that are parallel to a respective diode of a bridge branch of the rectifier bridge on the secondary side.

The rectifier consists of the diodes D5-D8. As shown in FIG. 3a, a semi-conductor switch T3 and T4 is additionally mounted in parallel to the respective diodes D7 and D8. The diodes D7, D8 and the semi-conductor switches T3, T4 constitute the boosting array 4 just as in the other examples as well. The boosting array 4 thus makes use of component parts of the rectifier. In principle, T3 and T4 may also be connected in parallel with the upper diodes of the rectifier D5 and D6.

In the boosting mode of operation, the semi-conductor switches T3 and T4 are triggered alternately at the same frequency as the semi-conductor switches T2 and T1. The semi-conductor switches T1 and T3 as well as the semi-conductor switches T2 and T4 are turned on at the same time. The semi-conductor switches T1 and T3 are turned on during the positive half wave of the high-frequency current through the inductance L1. The semi-conductor switches T2 and T4 are switched on during the negative half wave of the high-frequency current through the inductance L1. The turn-on time of the semi-conductor switch T3 and T4 respectively corresponds to that of the previous examples.

Figure 3B:
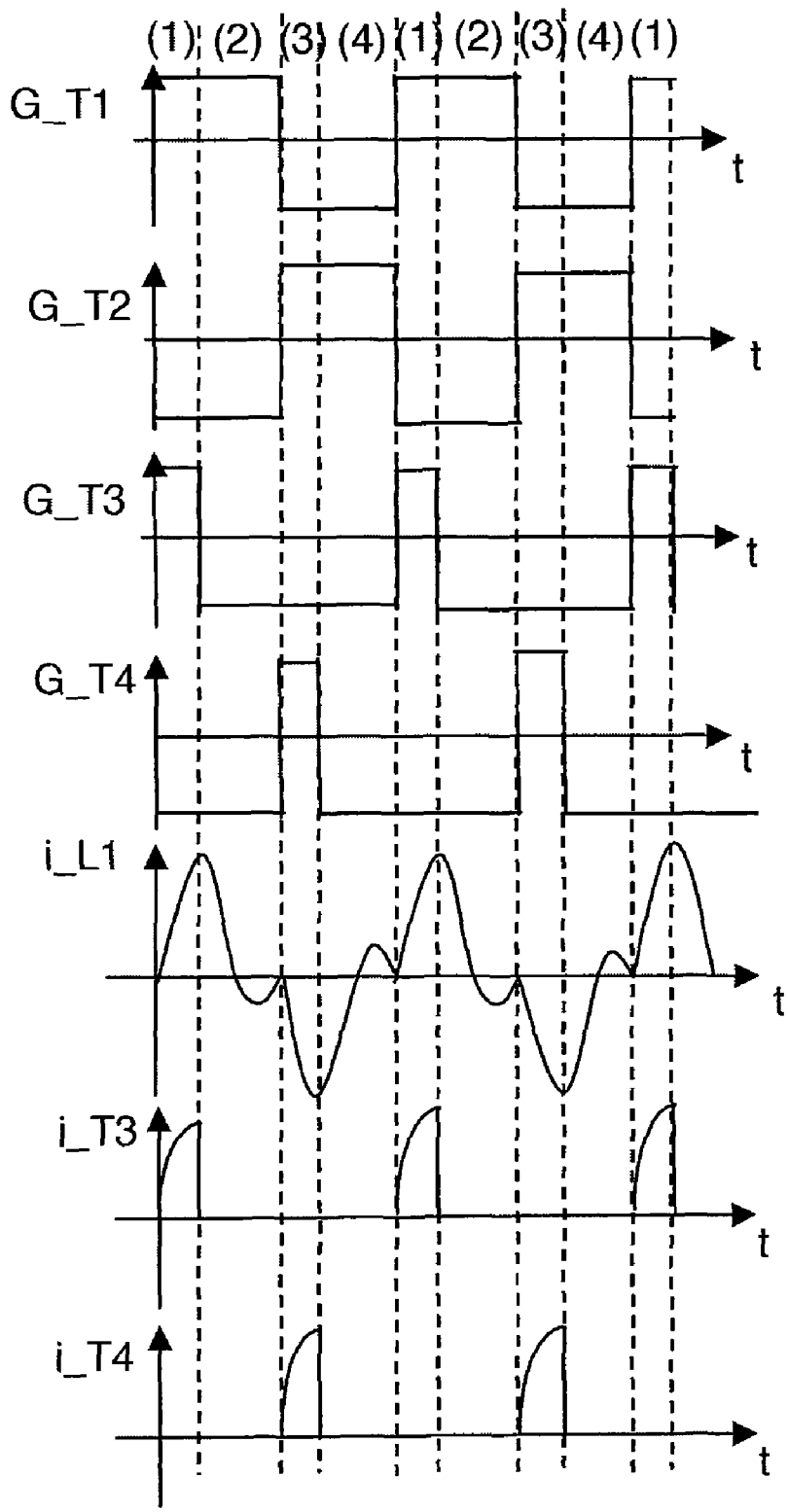

FIG. 3b shows the trigger signals at the gates of the semi-conductor switches T1, T2, T3 and T4 as well as the current through the inductance L1 and the current through the semi-conductor switches T3 and T4 in the boosting mode of operation.

One distinguishes four switching conditions:
(1) T1 on, T2 off, T3 on, T4 off
(2) T1 on, T2 off, T3 off, T4 off
(3) T1 off, T2 on, T3 off, T4 on
(4) T1 off, T2 on, T3 off, T4 off In the switching condition (1), a positive current flows through the semi-conductor switch T1 on the primary side. Since the semi-conductor switch T3 is closed, the current flows through the semi-conductor switch T3 and through the diode D8 on the secondary side. Through the incorporated resonance, the current flows in a sine wave through the inductance L1 and also through the semi-conductor switch T3 until the semi-conductor switch T3 is turned off. There is no energy transmission onto the capacitor C4.

In the switching condition (2), the semi-conductor switch T3 is open. The current on the primary side continues to flow in a sine wave through the inductance L1. On the secondary side, the current flows through the rectifier diodes D5 and D8. The capacitor C3 is charged. The energy stored in the inductance L1 and in the capacitor C3 in the switching condition (1) is delivered to the capacitor C4 so that the output voltage is significantly increased.

In the switching condition (3), the semi-conductor switch T2 is closed and the semi-conductor switch T1 open. On the primary side, the current flows through the semi-conductor switch T2. On the secondary side, the semi-conductor switch T4 is closed so that a current flows through the semi-conductor switch T4 and through the diode D7 on the secondary side. The current through the inductance L1 or through the semi-conductor switch T3 is again sinusoidal due to the resonance component parts L1, C3. The sign of the current is contrary to the condition (1) or (2). In this condition, the capacitor C4 is not charged further.

In the switching condition (4), the semi-conductor switch T4 is opened again. The current on the secondary side now flows through the rectifier, namely through the diodes D6 and D7. The capacitor C3 is charged. The energy stored in the inductance and in the capacitor C3 in the switching condition (1) is delivered to the capacitor C4 so that the output voltage is significantly increased.

Figure 4A:
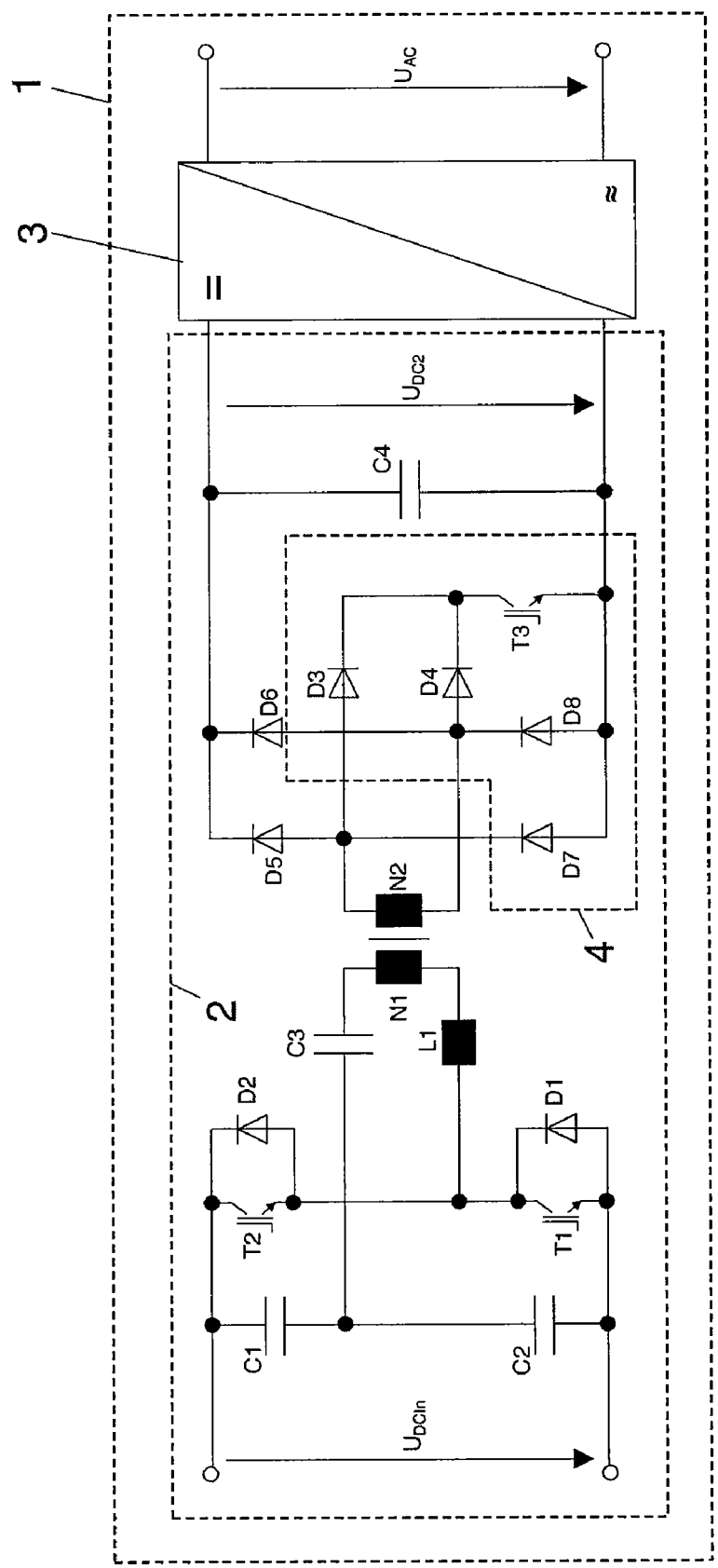
Figure 4B:
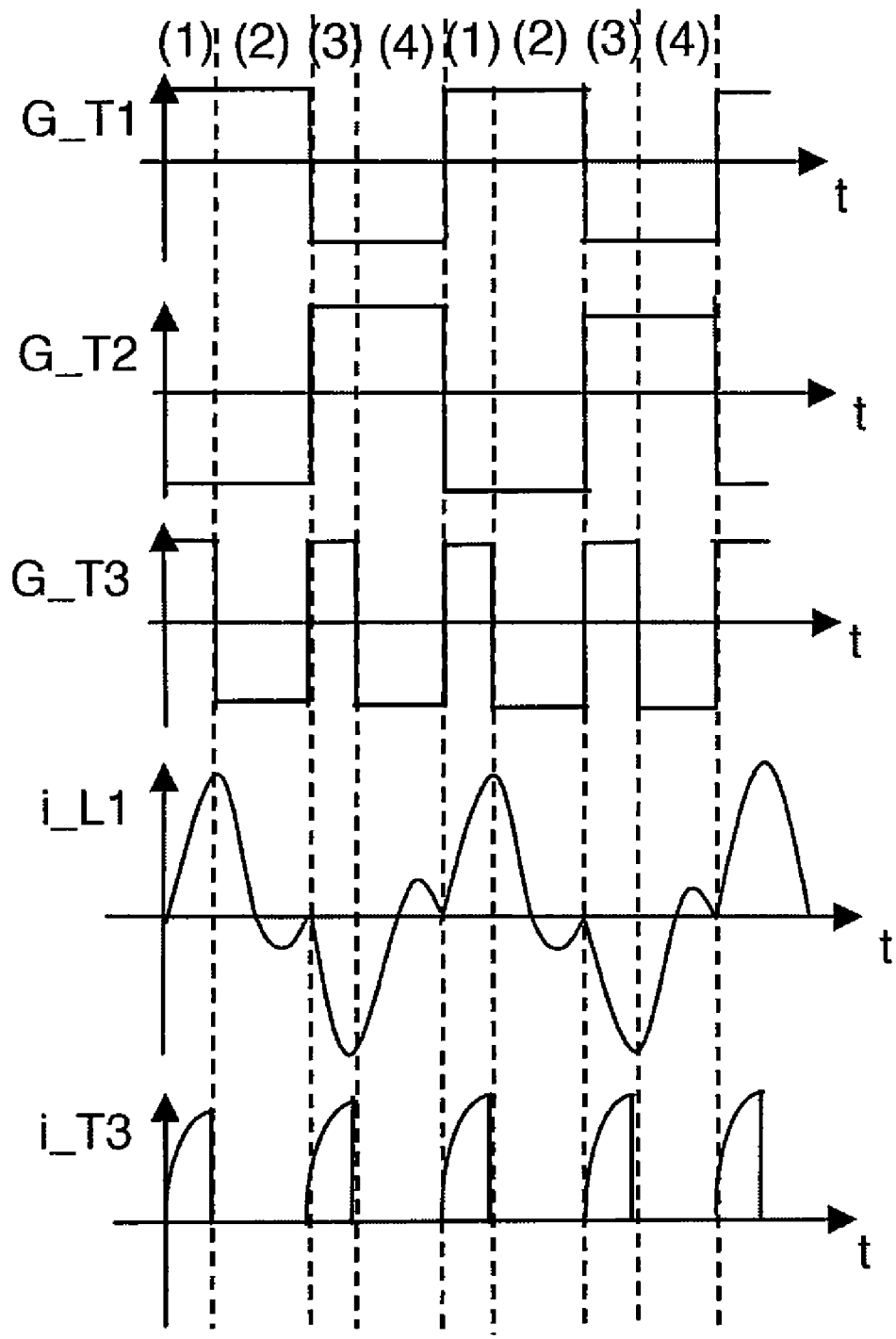

FIG. 4a illustrates a preferred variant in which the array of the invention 4 consists of an additional switching element T3. This switching element T3 is an IGBT for example. Then, the collector terminal is connected to the cathodes of two diodes D3 and D4 and the emitter terminal, to the anodes of the lower diodes D7, D8 of the rectifier bridge, consisting of the diodes D5-D8. The anode of D3 is connected to the one winding end of the secondary winding N2, the anode of D4 to the other winding end of the secondary winding N2. As a result, there is also a link to the AC terminals of the rectifier bridge for each diode. As a result, the series connection of the diode D4 and of the switch T3 is parallel to the diode D8 and the series connection of diode D3 and of switch T3 is parallel to diode D7. In principle, these series connections may also be connected in parallel to the upper diodes D5 or D6 of the rectifier bridge.

The diodes D3, D4 and the semi-conductor switch T3 constitute the boosting array 4, like in the other examples. The boosting array 4 additionally makes use of component parts of the rectifier.

In the boosting mode of operation, the semi-conductor switch T3 is triggered at twice the frequency of the semi-conductor switches T2 and T1. The semi-conductor switches T1 and T3 as well as the semi-conductor switches T2 and T3 are turned on at the same time. The semi-conductor switches T1 and T3 are turned on during the positive half wave of the high-frequency current through the inductance L1. The semi-conductor switches T2 and T3 are turned on during the negative half wave of the high-frequency current through the inductance L1. The turn-on time of the semi-conductor switch T3 corresponds to the previous examples.

FIG. 3b shows the trigger signals at the gates of the semi-conductor switches T1, T2, T3 and T4 as well as the current through the inductance L1 and the current through the semi-conductor switch T3 in the boosting mode of operation.

One distinguishes four switching conditions:
(1) T1 on, T2 off, T3 on
(2) T1 on, T2 off, T3 off
(3) T1 off, T2 on, T3 on
(4) T1 off, T2 on, T3 off In the switching condition (1), a positive current flows through the semi-conductor switch T1 on the primary side. Since the semi-conductor switch T3 is closed, the current flows through the diode D3, the semi-conductor switch T3 and the diode D8 on the secondary side. Through the incorporated resonance, the current through the inductance L1 and also through the semi-conductor switch T3 is sinusoidal until the semi-conductor switch T3 is switched off. No energy is transmitted to the capacitor C4.

In the switching condition (2), the semi-conductor switch T3 is open. The current on the primary side continues to flow in a sine wave through the inductance L1. On the secondary side, the current flows through the rectifier diodes D5 and D8. The capacitor C3 is charged. The energy stored in the inductance L1 and in the capacitor C3 in the switching condition (1) is delivered to the capacitor C4 so that the output voltage is significantly increased.

In the switching condition (3), the semi-conductor switch T2 is closed and the semi-conductor switch T1 open. On the primary side, the current flows through the semi-conductor switch T2. On the secondary side, the semi-conductor switch T3 is closed so that a current flows through the diode D4, the semi-conductor switch T3 and the diode D7 on the secondary side. The current through the inductance L1 or through the semi-conductor switch T3 is again sinusoidal due to the resonance component parts L1, C3. The sign of the current is contrary to the condition (1) or (2). In this condition, the capacitor C4 is not charged further.

In the switching condition (4), the semi-conductor switch T3 is opened again. The current on the secondary side now flows through the rectifier, namely through the diodes D6 and D7. The capacitor C3 is charged. The energy stored in the inductance and in the capacitor C3 in the switching condition (1) is delivered to the capacitor C4 so that the output voltage is significantly increased.

As compared to prior art, the invention advantageously integrates an energy conversion stage, the boost converter, in the resonance converter. As a result, the boost converter diode, which is provided in prior art, is obviated. This conductive diode causes losses, even if the boost converter is not operative. Thanks to the invention, these losses are eliminated and the efficiency improved. The choke of the boost converter connected upstream thereof in prior art is absent. For the boosting array of the invention, one makes use of the resonance inductance. The resonance inductance can be configured as an additional choke L1 and/or also be the stray inductance of the HF transformer. As a result, an additional boost choke like in prior art is not needed so that one saves one component part and costs, as a result thereof.

HF transformer is understood to refer to any transformer that has a frequency higher than that of the grid.

For the switches T1-T4, all current switches, preferably the semi-conductor switches such as metal oxide semiconductor field effect transistors (MOSFETs) or insulated gate bipolar transistor (IGBTs), can be utilized.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A power converter comprising:
a plurality of input switches coupled to a DC input voltage;
a resonant circuit coupled to the plurality of input switches;
a transformer comprising a first winding coupled to the plurality of input switches;
a rectifier bridge comprising an input port coupled to a second winding of the transformer and an output port configured to be coupled to a load of the power converter; and
a voltage booster circuit coupled in parallel with the second winding of the transformer and in parallel with the input port of the rectifier bridge, the voltage booster circuit comprising at least one switch configured to provide a low impedance path to the resonant circuit, between terminals of the input port of the rectifier bridge, and in parallel with the second winding of the transformer when the switch is closed,
wherein
the plurality of input switches are configured to charge the first winding and the resonant circuit to a first polarity during a first charge period,
the at least one switch is configured to be closed starting from a beginning of the first charge period until an end of a first portion of the first charge period, the first portion of the first charge period comprising a shorter duration than the first charge period.

2. The power converter of claim 1, wherein
the plurality of input switches are configured to charge the first winding and the resonant circuit to a second polarity during a second charge period, wherein the second polarity is opposite the first polarity, and
the at least one switch is configured to be closed starting from a beginning of the second charge period until an end of a first portion of the second charge period, the first portion of the second charge period comprising a shorter duration then the second charge period.

3. The power converter of claim 1, wherein the plurality of input switches are configured to charge the first winding and the resonant circuit with a first pulse width.

4. The power converter of claim 1, wherein the resonant circuit comprises an inductor coupled between a common node of the plurality of input switches and a first terminal of the first winding of the transformer.

5. The power converter of claim 4, wherein the resonant circuit further comprises a capacitor coupled to a terminal of the first winding of the transformer, and wherein a low impedance path is formed between the inductor and the capacitor of the resonant circuit when the at least one switch is closed.

6. The power converter of claim 1, wherein the voltage booster circuit comprises:
a first diode having a cathode coupled to a first interface node, and an anode coupled to a first internal node;
a second diode having a cathode coupled to a second interface node and an anode coupled to the first internal node;
a third diode having an anode coupled to the first interface node, and a cathode coupled to a second internal node; and
a fourth diode having an anode coupled to the second interface node and a cathode coupled to the second internal node, wherein the at least one switch comprises a switch coupled between the first internal node and the second internal node.

7. The power converter of claim 6, wherein:
the first interface node is coupled to the first terminal of the second winding of the transformer; and
the second interface node is coupled to the second terminal of the second winding of the transformer.

8. The power converter of claim 1, wherein the voltage booster circuit comprises:
a first diode coupled between a first interface node and a first internal node; and
a second diode coupled between a second interface node and the first internal node, wherein the at least one switch comprises a first switch between an anode and a cathode of the first diode.

9. The power converter of claim 8, wherein the at least one switch further comprises a second switch coupled between an anode and a cathode of the second diode.

10. The power converter of claim 8, further comprising:
a third diode coupled between the first interface node and a second internal node; and
a fourth diode coupled between the second interface node and the second internal node, wherein the at least one switch comprises a second switch between an anode and a cathode of the third diode.

11. The power converter of claim 1, further comprising a DC to AC converter coupled to the rectifier bridge.

12. A method of operating a power converter comprising a plurality of input switches coupled to a DC input voltage, a resonant circuit coupled to the plurality of input switches, a transformer comprising a first winding coupled to the plurality of switches, a rectifier bridge comprising an input port coupled to a second winding of the transformer and an output port configured to be coupled to a load of the power converter, and a voltage booster circuit coupled in parallel with the second winding of the transformer and in parallel with the input port of the rectifier bridge, the voltage booster circuit comprising at least one switch configured to provide a low impedance path to the resonant circuit, between terminals of the input port of the rectifier bridge, and in parallel with a second terminal of the second winding of the transformer when the at least one switch is closed, the method comprising:

charging the first winding and the resonant circuit according to a first polarity by coupling a first of the plurality of input switches to a first DC voltage during a first charge period; and
closing the at least one switch at a beginning of a first portion of the first charge period and opening the at least one switch during a remaining portion of the first charge period.

13. The method of claim 12, further comprising:
charging the first winding and the resonant circuit according to a second polarity by coupling a second of the plurality of input switches to a second DC voltage during a second charge period, wherein the second polarity is opposite from the first polarity; and
closing the at least one switch at a beginning of a first portion of the second charge period and opening the at least one switch during a remaining portion of the second charge period.

14. The method of claim 13, wherein
the first portion of the first charge period ends after a current though an inductor of the resonant circuit reaches a first maximum current; and
the first portion of the second charge period ends after the current though the inductor of the resonant circuit reaches a second maximum current, the second maximum current having a opposite polarity as the first maximum current.

15. The method of claim 12, further comprising:
comparing a DC input voltage of the power converter with a threshold; and
performing the steps of closing the at least one switch at the beginning of the first charge period only if the DC input voltage of the power converter is less than the threshold.

16. The method of claim 12, further comprising converting a DC voltage at an output of the rectifier bridge to an AC voltage.

17. A power converter comprising:
a plurality of input switches coupled to a plurality of DC input voltage terminals;
a resonance inductor;
a resonance capacitor;
a transformer comprising a first winding and a second winding, wherein the resonance inductor, the resonance capacitor, and the first winding of the transformer are continuously connected in series between at least one of the plurality of input switches and a reference node;
a voltage boosting network comprising at least one switch and at least one boosting diode, the voltage boosting network coupled to a first end and a second end of the second winding of the transformer; and
a rectifier bridge comprising at least four diodes coupled between the voltage boosting network and a plurality of DC output terminals, wherein the voltage boosting network is configured to provide a low impedance path in parallel with the second winding of the transformer and across terminals of an input port of the rectifier bridge when the at least one switch is closed.

18. The power converter of claim 17, further comprising capacitors coupled between the reference node and each of the plurality of DC input terminals.

19. The power converter of claim 17, further comprising a DC to AC converter coupled between the plurality of DC output terminals and a plurality of AC output terminals.

20. The power converter of claim 17, wherein the boosting network comprises a diode bridge coupled between the second winding of the transformer and the at least one switch.

21. The power converter of claim 17, wherein the at least one switch and the at least one boosting diode form a bidirectional switch.

22. The power converter of claim 17, wherein the boosting network comprises:
a plurality of boosting diodes coupled in series between the first end and the second end of the transformer, wherein each of the plurality of boosting diodes is coupled in parallel with a corresponding switch.

23. The power converter of claim 17, wherein the boosting network comprises:
a first diode coupled between a first terminal of the second winding of the transformer and a first terminal of the at least one switch; and
a second diode coupled between a second terminal of the second winding of the transformer and the first terminal of the at least one switch.

* * * * *